US012460278B2

(12) United States Patent
Ichigozaki et al.

(10) Patent No.: US 12,460,278 B2
(45) Date of Patent: Nov. 4, 2025

(54) PRODUCTION METHOD OF RARE EARTH MAGNET

(71) Applicant: TOYOTA JIDOSHA KABUSHIKI KAISHA, Toyota (JP)

(72) Inventors: Daisuke Ichigozaki, Toyota (JP); Tatsuhiko Hirano, Toyota (JP); Noritsugu Sakuma, Mishima (JP); Akihito Kinoshita, Mishima (JP); Masaaki Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 17/137,026

(22) Filed: Dec. 29, 2020

(65) Prior Publication Data

US 2021/0272751 A1 Sep. 2, 2021

(30) Foreign Application Priority Data

Feb. 27, 2020 (JP) ................................ 2020-031997

(51) Int. Cl.
*C22C 1/04* (2023.01)
*B22F 1/17* (2022.01)
*H01F 41/02* (2006.01)

(52) U.S. Cl.
CPC .............. *C22C 1/0483* (2013.01); *B22F 1/17* (2022.01); *H01F 41/0266* (2013.01); *B22F 2202/05* (2013.01)

(58) Field of Classification Search
CPC .... B22F 2202/05; B22F 1/17; B22F 2998/10; B22F 1/10; H01F 41/0266; H01F 1/0552; H01F 1/0557; H01F 1/0596; H01F 1/0558
See application file for complete search history.

(56) References Cited

U.S. PATENT DOCUMENTS

2010/0261038 A1* 10/2010 Imaoka .................... H01F 1/09 427/127
2017/0186519 A1 6/2017 Maehara
(Continued)

FOREIGN PATENT DOCUMENTS

CN 110942881 A 3/2020
GB 1398588 * 6/1975
(Continued)

OTHER PUBLICATIONS

U.S. Appl. No. 17/563,134, filed Dec. 28, 2021, in the name of Daisuke Ichigozaki et al.
(Continued)

*Primary Examiner* — Nicholas A Wang
(74) *Attorney, Agent, or Firm* — Oliff PLC

(57) ABSTRACT

The production method of a rare earth magnet of the present disclosure includes a coated magnetic powder preparation step, a mixed powder preparation step, and a pressure sintering step. In the coated magnetic preparation step, a zinc-containing coating 12 is formed on the particle surface of a samarium-iron-nitrogen-based magnetic powder to obtain a coated magnetic powder 14. In the mixed powder preparation step, a binder powder 20 having a melting point not higher than the melting point of the coating 12 and the coated magnetic powder 14 are mixed to obtain a mixed powder. In the pressure sintering step, denoting as $T_1$° C. the temperature at which the peak disappears in an X-ray diffraction pattern of the binder powder 20 and as $T_2$° C. the temperature at which the magnetic phase in the samarium-iron-nitrogen-based magnetic powder 10 decomposes, the mixed powder is pressure-sintered at $T_1$° C. or more and ($T_2$−50° C.) or less.

10 Claims, 8 Drawing Sheets

(56) References Cited

U.S. PATENT DOCUMENTS

| | | | |
|---|---|---|---|
| 2018/0226180 A1 | 8/2018 | Kawashita et al. |
| 2019/0006068 A1 | 1/2019 | Sakuma et al. |
| 2019/0311826 A1 | 10/2019 | Sakuma et al. |
| 2020/0098496 A1 | 3/2020 | Kinoshita et al. |
| 2021/0272751 A1 | 9/2021 | Ichigozaki et al. |
| 2021/0304933 A1 | 9/2021 | Tang et al. |
| 2022/0246336 A1 | 8/2022 | Ichigozaki et al. |
| 2023/0162913 A1 | 5/2023 | Ito et al. |

FOREIGN PATENT DOCUMENTS

| | | | | |
|---|---|---|---|---|
| JP | 04354104 | A | | 12/1992 |
| JP | H04-368102 | A | | 12/1992 |
| JP | 06020815 | A | | 1/1994 |
| JP | H06-020815 | A | | 1/1994 |
| JP | H06-077025 | A | | 3/1994 |
| JP | H0677025 | | * | 3/1994 |
| JP | H09237708 | | * | 9/1997 |
| JP | 2001-254168 | A | | 9/2001 |
| JP | 2002-043110 | A | | 2/2002 |
| JP | 2003-168602 | A | | 6/2003 |
| JP | 2015-201628 | A | | 11/2015 |
| JP | WO2015198396 | | * | 12/2015 |
| JP | 2017-055072 | A | | 3/2017 |
| JP | 2017-117937 | A | | 6/2017 |
| JP | 2019-012796 | A | | 1/2019 |
| JP | 2019-012811 | A | | 1/2019 |
| JP | 6455238 | B2 | | 1/2019 |
| JP | 2019012796 | | * | 1/2019 |
| JP | 2019-186368 | A | | 10/2019 |
| JP | 2020-050892 | A | | 4/2020 |
| JP | 2020-057644 | A | | 4/2020 |
| JP | 2020-057645 | A | | 4/2020 |
| JP | 2020-057646 | A | | 4/2020 |
| JP | 2020-102606 | A | | 7/2020 |
| JP | 2020-155545 | A | | 9/2020 |
| JP | 2020-155740 | A | | 9/2020 |
| JP | 2020-161704 | A | | 10/2020 |
| JP | 2021-052111 | A | | 4/2021 |
| WO | 2015/199096 | A1 | | 12/2015 |

OTHER PUBLICATIONS

Jan. 13, 2023 Office Action issued in U.S. Appl. No. 17/539,491.

Prabhu et al., "Enhanced coercivity of spark plasma sintered Zn-bonded Sm—Fe—N magnets," SciVerse ScienceDirect, Scripta Materialia 67, 2012, pp. 153-156.

Takagi et al., "Fabrication of Zn/Sm2Fe17N3 Sintered Magnets by High-Pressure Current Sintering," J. Jpn. Soc. Powder Powder Metallurgy, vol. 59, No. 9, Dec. 2, 2011, pp. 564-569.

Jan. 11, 2023 Office Action issued in U.S. Appl. No. 17/563,134.

Oct. 21, 2022 Office Action issued in U.S. Appl. No. 17/539,491.

Prabhu et al. Enhanced coercivity of spark plasma sintered Zn-bonded Sm—Fe—N magnets. Scripta Materilia 67 (2012) 153-156. (Year: 2012).

Takagi et al. Fabrication of Zn—Sm2Fe17N3 sintered magnets by high-pressure current sintering. J. Jpn. Soc. Powder Powder Metallurgy vol. 59, No. 9, 564-569. (Year: 2011).

May 19, 2023 Office Action issued in U.S. Appl. No. 17/539,491.

U.S. Appl. No. 17/137,026, filed Dec. 29, 2020, in the name of Daisuke Ichigozaki et al.

U.S. Appl. No. 17/539,491, filed Dec. 1, 2021, in the name of Masaaki Ito et al.

Jun. 22, 2023 U.S. Office Action issued U.S. Appl. No. 17/563,134.

Feb. 26, 2024 Office Action issued in U.S. Appl. No. 17/539,491.

Sep. 29, 2024 Notice Of Allowance Issued in U.S. Appl. No. 17/539,491.

* cited by examiner

PRODUCTION METHOD OF RARE EARTH MAGNET

TECHNICAL FIELD

The present disclosure relates to a production method of a rare earth magnet. More specifically, the present disclosure relates to a production method of a samarium-iron-nitrogen-based rare earth magnet.

BACKGROUND ART

As a high-performance rare earth magnet, a samarium-cobalt-based rare earth magnet and a neodymium-iron-boron-based rare earth magnet are put into practical use, but in recent years, studies are being made on a rare earth magnet other than these. For example, a rare earth magnet containing samarium, iron and nitrogen and including a magnetic phase having at least either one of $Th_2Zn_{17}$ type and $Th_2Ni_{17}$ type crystal structures (hereinafter, sometimes referred to as "samarium-iron-nitrogen-based rare earth magnet") is being studied. The samarium-iron-nitrogen-based rare earth magnet is produced using a magnetic powder containing samarium, iron and nitrogen (hereinafter, sometimes referred to as "samarium-iron-nitrogen-based magnetic powder").

The samarium-iron-nitrogen-based magnetic powder includes a magnetic phase having at least either one of $Th_2Zn_{17}$ type and $Th_2Ni_{17}$ type crystal structures. In this magnetic phase, nitrogen is considered as forming an interstitial solid solution in a samarium-iron crystal. Consequently, in the samarium-iron-nitrogen magnetic powder, nitrogen is likely to dissociate and decompose due to heat. Accordingly, at the time of production of a samarium-iron-nitrogen-based rare earth magnet (molded body), the samarium-iron-nitrogen-based magnetic powder needs to be molded at a temperature allowing no dissociation of nitrogen in the magnetic phase.

Such a molding method includes, for example, the production method of a rare earth magnet disclosed in Patent Literature 1. In this production method, a mixed powder of a samarium-iron-nitrogen-based magnetic powder and a metallic zinc-containing powder (hereinafter, sometimes referred to as "metallic zinc powder") is compression-molded in a magnetic field, and the obtained green compact is pressure-sintered (including liquid-phase sintering). Incidentally, in the present description, metallic zinc means unalloyed zinc. In addition, a zinc alloy means an alloy of zinc and a metal element other than zinc, and zinc or a zinc component means a zinc element.

When it is intended to sinter a green compact of only a samarium-iron-nitrogen magnetic powder without using a metallic zinc powder, the sintering temperature rises above a temperature at which nitrogen in the samarium-iron-nitrogen-based magnetic powder dissociates, and sintering cannot be performed. However, in the case of pressure-sintering (including liquid-phase sintering) a green compact of a mixed powder of a samarium-iron-nitrogen-based magnetic powder and a metallic zinc powder, the sintering temperature can be below a temperature at which nitrogen in the samarium-iron-nitrogen-based magnetic powder dissociates.

When a green compact of a mixed powder of a samarium-iron-nitrogen-based magnetic powder and a metallic zinc powder is pressure-sintered (including liquid-phase sintering), a zinc component in the metallic zinc powder undergoes solid-phase or liquid-phase diffusion on the particle surface of the samarium-iron-nitrogen-based magnetic powder, and sintering (solidification) is then effected. This teaches that in the production method of a rare earth magnet disclosed in Patent Literature 1, the metallic zinc powder has a binder function.

The samarium-iron-nitrogen-based magnetic powder usually contains oxygen and also includes an αFe phase that is a soft magnetic phase. Oxygen and αFe phase reduce the coercive force. In the production method of a rare earth magnet disclosed in Patent Literature 1, the metallic zinc powder is considered to have, in addition to a binder function, a function as a modifier of absorbing oxygen in the samarium-iron-nitrogen-based magnetic powder and forming a nonmagnetic phase from αFe phase, thereby enhancing the coercive force.

These binder function and modifier function are expected to be recognized not only in the metallic zinc powder but also in a zinc-containing powder as well. The zinc-containing powder means at least either one of a metallic zinc-containing powder and a zinc alloy-containing powder. More specifically, in conventional production methods of a samarium-iron-boron-based rare earth magnet, the zinc-containing powder has been used as a binder and a modifier.

CITATION LIST

Patent Literature

[PTL 1] International Publication WO2015/199096

SUMMARY OF INVENTION

Technical Problem

As the molding method (production method) of a samarium-iron-nitrogen-based rare earth magnet, sintering has been conventionally studied, because sintering is considered to be advantageous for obtaining a high-density molded body (sintered body), compared to performing injection molding of a raw material powder together with a resin. In a production method of a neodymium-iron-boron-based rare earth magnet that is most prevalent today, in the case of sintering a raw material powder having a micro-level magnetic phase, pressureless sintering at a high temperature is employed. In addition, in the case of sintering a raw material powder having a nano-level magnetic phase, pressure sintering at a low temperature is employed so as to avoid coarsening of the magnetic phase. In both cases, the density of the sintered body obtained is high.

In the case of producing a molded body (rare earth magnet) by using a samarium-iron-nitrogen-based magnetic powder, even when the magnetic phase is not at a nano level, a molding method capable of avoiding dissociation of nitrogen needs to be employed as described above. Therefore, pressure sintering at a low temperature is employed, and at this time, a zinc-containing powder is mixed with a samarium-iron-nitrogen-based magnetic powder as described above. However, even when a zinc-containing powder is mixed and the mixed powder is pressure-sintered, a sintered body having a high density is not obtained in some cases. This has led the present inventors to find out a problem that even when a mixed powder of a samarium-iron-nitrogen-based magnetic powder and a zinc-containing powder is pressure-sintered, the density of the sintered body may not be sufficient, as a result, the residual magnetization may be reduced.

The present disclosure has been made to solve the problem above. That is, an object of the present disclosure is to provide a production method of a samarium-iron-nitrogen-based rare earth magnet, which can increase the density of the sintered body and enhance the residual magnetization.

Solution to Problem

The present inventors have conducted many intensive studies so as to attain the above-described object and accomplished the production method of a rare earth magnet of the present disclosure. The production method of a rare earth magnet of the present disclosure includes the following embodiments.

<1>A production method of a rare earth magnet, including:

forming a zinc-containing coating on the particle surface of a magnetic powder containing samarium, iron and nitrogen and including a magnetic phase having at least either one of $Th_2Zn_{17}$ type and $Th_2Ni_{17}$ type crystal structures to obtain a coated magnetic powder, mixing a binder powder having a melting point not higher than the melting point of the coating with the magnetic powder to obtain a mixed powder, and pressure-sintering the mixed powder at $T_1$° C. or more and ($T_2$−50° C.) or less, wherein a temperature at which a peak disappears in an X-ray diffraction pattern of the binder powder is denoted as $T_1$° C. and a temperature at which the magnetic phase decomposes is denoted as $T_2$° C.

<2> The production method of a rare earth magnet according to item <1>, wherein in a cross-section of a particle of the coated magnetic powder, the percentage of the length of a portion where the particle surface of the magnetic powder is covered by the coating, relative to the entire circumferential length of the particle surface of the magnetic powder, is 90% or more.

<3> The production method of a rare earth magnet according to item <1> or <2>, wherein the binder powder is at least either one of a powder containing a metal other than zinc and a powder containing an alloy of a metal other than zinc.

<4> The production method of a rare earth magnet according to item <1> or <2>, wherein the binder powder is one or more powders selected from the group consisting of a metallic zinc-containing powder, a zinc-aluminum-based alloy-containing powder, an aluminum-lanthanum-copper-based alloy-containing powder, a metallic tin-containing powder, and a metallic bismuth-containing powder.

<5> The production method of a rare earth magnet according to any one of items <1> to <4>, wherein the mixed powder is pressure-sintered at a temperature not lower than the melting point of the binder powder.

<6> The production method of a rare earth magnet according to any one of items <1> to <5>, further including compression-molding the mixed powder in a magnetic field before the pressure sintering.

Advantageous Effects of Invention

According to the present disclosure, friction on the powder particle surface is reduced due to a coating previously formed on the particle surface of a samarium-iron-nitrogen-based magnetic powder, and flowing of powder particles is promoted during pressure sintering due to the accompanying softened or melted binder. As a result, a production method of a samarium-iron-nitrogen-based rare earth magnet, which can increase the density of the sintered body and enhance the residual magnetization, can be provided.

DESCRIPTION OF EMBODIMENTS

The embodiment of the production method of a rare earth magnet of the present disclosure is described in detail below. Note that the following embodiment should not be construed to limit the production method of a rare earth magnet of the present disclosure.

Although not bound by theory, the knowledge regarding the reason, etc. for an increase in the density of the sintered body in the production method of a rare earth magnet of the present disclosure is described using the drawings by comparison with the conventional production method, etc. of a rare earth magnet.

Figure 1A:
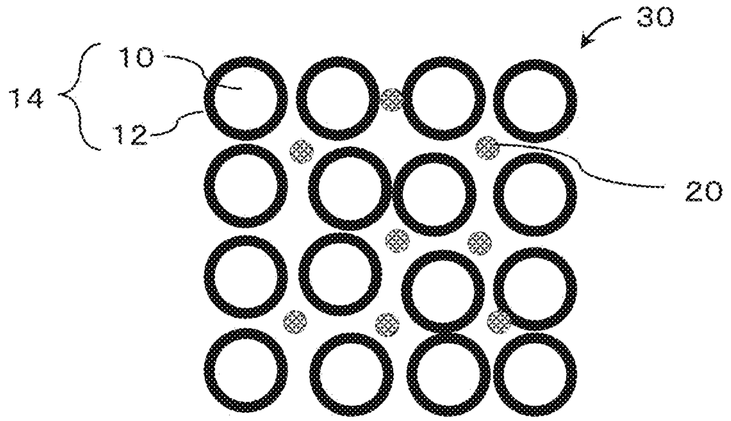
FIG. 1A is an explanatory diagram schematically illustrating a green compact of a coated magnetic powder and a binder powder in one example of the production method of a rare earth magnet of the present disclosure.
Figure 1B:
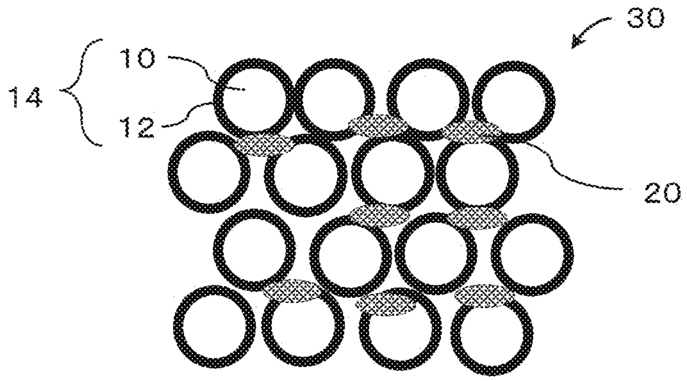
FIG. 1B is an explanatory diagram illustrating the state when the green compact of FIG. 1A is heated and the particles of the binder powder are softened.
Figure 1C:
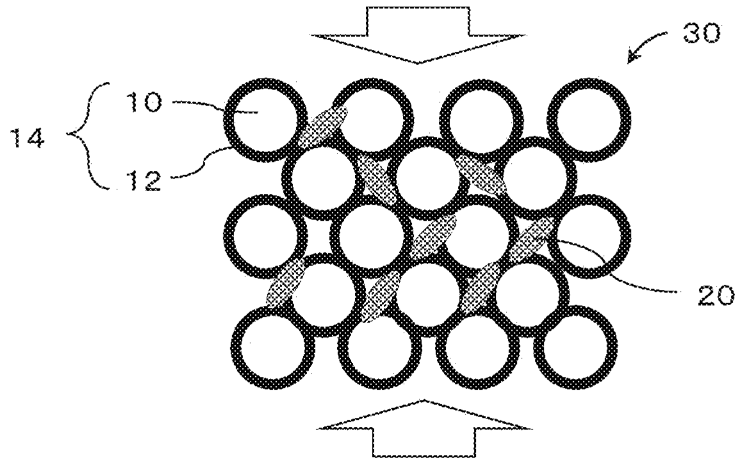
FIG. 1C is an explanatory diagram schematically illustrating the state when a pressure is applied in the state of FIG. 1B.

FIG. 1A to FIG. 1C are explanatory diagrams schematically illustrating one example of the production method of a rare earth magnet of the present disclosure. FIG. 1A is an explanatory diagram schematically illustrating a green compact of a coated magnetic powder and a binder powder. FIG. 1B is an explanatory diagram illustrating the state when the green compact of FIG. 1A is heated and the particles of the binder powder are softened. FIG. 1C is an explanatory diagram schematically illustrating the state when a pressure is applied in the state of FIG. 1B.

As illustrated in FIG. 1A, a green compact 30 is formed by a coated magnetic powder 14 and a binder powder 20. The coated magnetic powder 14 is obtained by forming a coating 12 on the surface of a samarium-iron-nitrogen-based magnetic powder 10. For convenience of description, the spacing (gap) between powder particles constituting the green compact 30 is depicted in an exaggerated manner from actual one, compared with the powder particle size. Unless otherwise indicated, the same holds true for the drawings other than FIG. 1A.

When the green compact 30 is heated, as illustrated in FIG. 1B, the binder powder 20 is softened and deforms. In the state of FIG. 1B, as illustrated in FIG. 1C, a pressure is applied to the green compact 30 in the direction indicated by hollow arrows, as a result, particles of the coated magnetic powder 14 flow to get closer to one another. When the pressure sintering is completed in the state illustrated in FIG. 1C, a sintered body having a high density is obtained.

In the production method of a rare earth magnet of the present disclosure, good flow of powder particles is obtained, and one of causes thereof is that when the green compact 30 is heated, the binder powder 20 is softened to promote flowability of each particle of the coated magnetic powder 14, but this is not considered to be the sole cause. The particle of the samarium-iron-nitrogen-based magnetic powder 10 not having a coating 12 has a large coefficient of friction on its surface and even when the binder powder 20 is softened, good flow of powder particles is not obtained. The coefficient of friction on the particle surface of the coated magnetic powder 14 is reduced by the coating 12, and this is considered to contribute as well to good flow of powder particles. In order to verify this suggestion, the conventional production method of a rare earth magnet is described using the drawings.

Figure 7A:
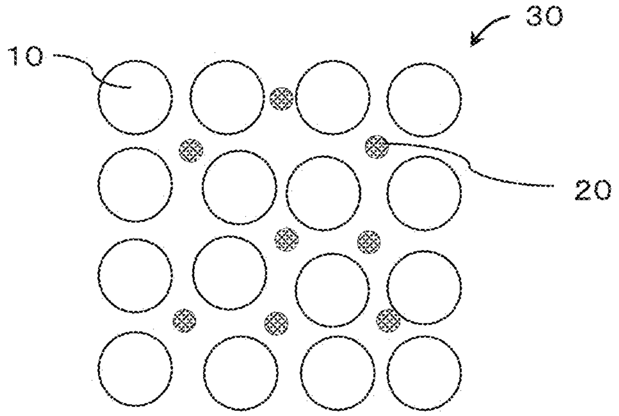
FIG. 7A is an explanatory diagram schematically illustrating a green compact of a samarium-iron-nitrogen-based magnetic powder and a binder powder in one example of the conventional production method of a rare earth magnet.
Figure 7B:
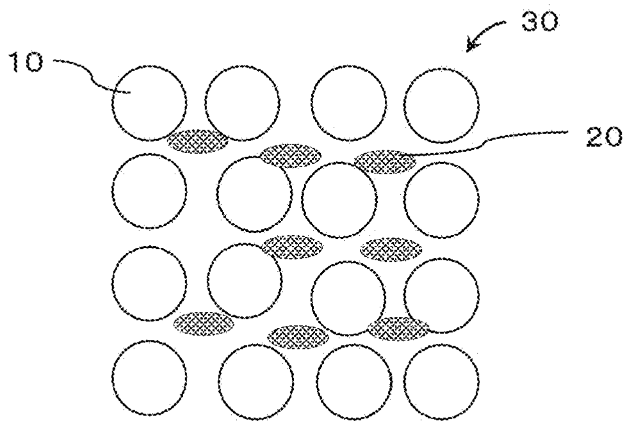
FIG. 7B is an explanatory diagram illustrating the state when the green compact of FIG. 7A is heated and the particles of the binder powder are softened.
Figure 7C:
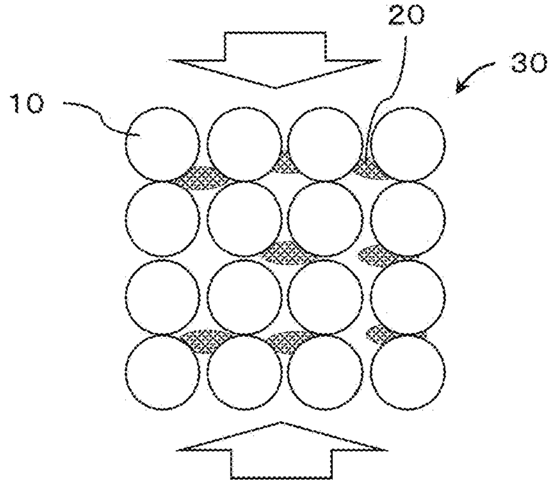
FIG. 7C is an explanatory diagram schematically illustrating the state when a pressure is applied in the state of FIG. 7B.

FIG. 7A to FIG. 7C are explanatory diagrams schematically illustrating one example of the conventional production method of a rare earth magnet. This corresponds to the method of the later-described Comparative Example 1. FIG. 7A is an explanatory diagram schematically illustrating a green compact of a samarium-iron-nitrogen-based magnetic powder and a binder powder. FIG. 7B is an explanatory diagram illustrating the state when the green compact of FIG. 7A is heated and the particles of the binder powder are softened. FIG. 7C is an explanatory diagram schematically illustrating the state when a pressure is applied in the state of FIG. 7B.

As illustrated in FIG. 7A, a green compact 30 is formed by a samarium-iron-nitrogen-based magnetic powder 10 and a binder powder 20. On the particle surface of the samarium-iron-nitrogen-based magnetic powder 10, a coating is not particularly formed.

When the green compact 30 is heated, as illustrated in FIG. 7B, the binder powder 20 is softened and deforms. In the state of FIG. 7B, as illustrated in FIG. 7C, a pressure is applied to the green compact 30 in the direction indicated by hollow arrows, as a result, spacing between respective particles of the samarium-iron-nitrogen-based magnetic powder 10 is narrowed, and the binder powder 20 further undergoes deformation, but the flowability of powder particles is little enhanced. This is considered to occur because the coefficient of friction on the particle surface of the samarium-iron-nitrogen-based magnetic powder 10 is large.

Figure 8A:
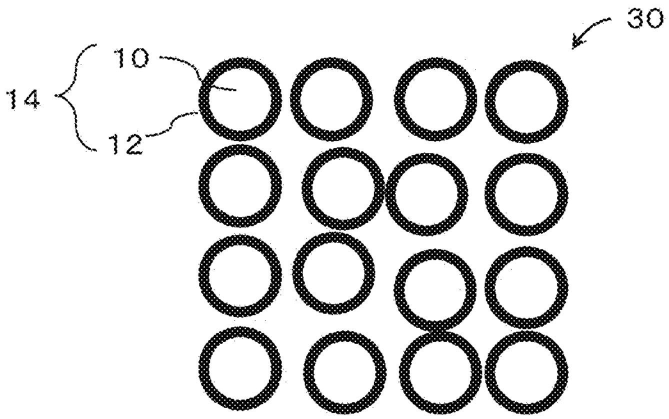
FIG. 8A is an explanatory diagram schematically illustrating a green compact of a coated magnetic powder in another example of the conventional production method of a rare earth magnet.
Figure 8B:
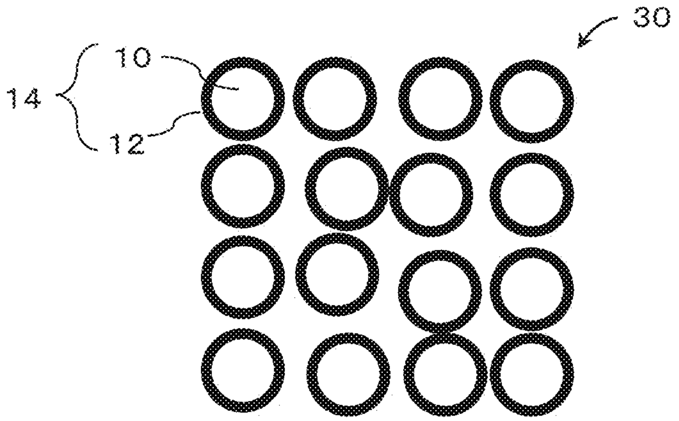
FIG. 8B is an explanatory diagram illustrating the state when the green compact of FIG. 8A is heated.
Figure 8C:
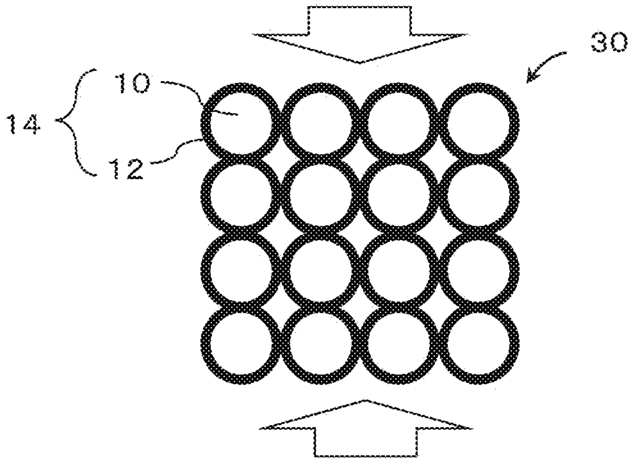
FIG. 8C is an explanatory diagram schematically illustrating the state when a pressure is applied in the state of FIG. 8C.

FIG. 8A and FIG. 8B are explanatory diagrams schematically illustrating another example of the conventional production method of a rare earth magnet. This corresponds to the method of the later-described Comparative Example 2. FIG. 8A is an explanatory diagram schematically illustrating a green compact of a coated magnetic powder. FIG. 8B is an explanatory diagram illustrating the state when the green compact of FIG. 8A is heated. FIG. 8C is an explanatory diagram schematically illustrating the state when a pressure is applied in the state of FIG. 8C.

As illustrated in FIG. 8A, in this method, a coated magnetic powder 14 forms a green compact 30, and the green compact 30 does not contain a binder powder. The coated magnetic powder 14 is obtained by forming a coating 12 on the particle surface of a samarium-iron-nitrogen-based magnetic powder 10. Since the green compact 30 does not contain a binder powder, even when the green compact 30 is heated, there is no particular change as illustrated in FIG. 8B. In the state of FIG. 8B, as illustrated in FIG. 8C, a pressure is applied to the green compact 30 in the direction indicated by hollow arrows, as a result, spacing between respective particles of the coated magnetic powder 14 is narrowed, but the flowability of powder particles is little enhanced.

Figure 2A:
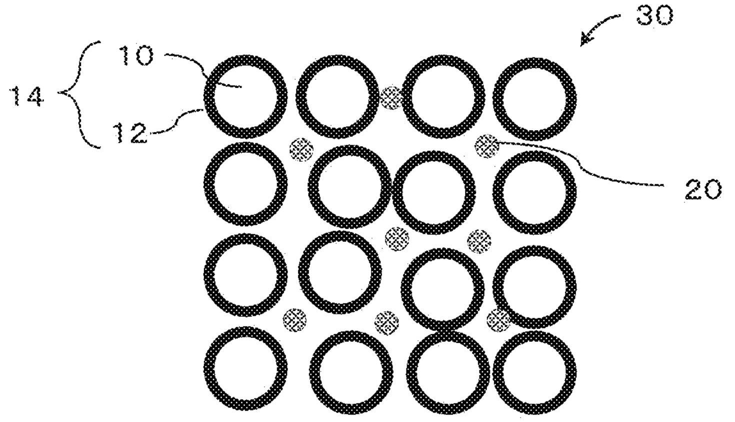
FIG. 2A is an explanatory diagram schematically illustrating a green compact of a coated magnetic powder and a binder powder in another example of the production method of a rare earth magnet of the present disclosure.
Figure 2B:
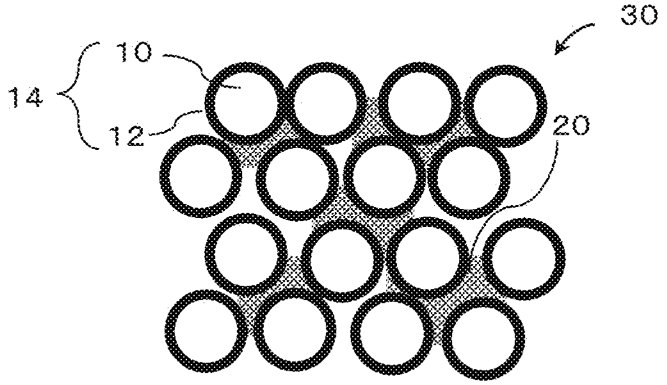
FIG. 2B is an explanatory diagram illustrating the state when the green compact of FIG. 2A is heated and the particles of the binder powder are melted.
Figure 2C:
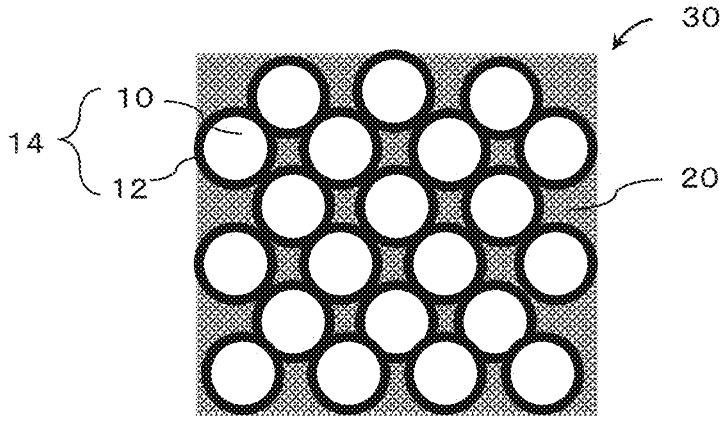
FIG. 2C is an explanatory diagram schematically illustrating the state when a pressure is applied in the state of FIG. 2B.

That is, in the production method of a rare earth magnet of the present disclosure, 1) a coating is formed on the particle surface of a samarium-iron-nitrogen-based magnetic powder to reduce the coefficient of friction on the surface of the powder particle before the formation of a coating, and 2) the flowability of each particle of the coated magnetic powder is promoted by a binder powder so as to increase the density of the sintered body. In FIG. 1A to FIG. 1C, the case of softening particles of the binder powder is described, but the same effects are obtained also when the binder powder is melted as illustrated in FIG. 2A to FIG. 2C. Incidentally, the temperature at which particles of the binder powder are softened is described in detail later.

FIG. 2A to FIG. 2C are explanatory diagram schematically illustrating a different example from FIG. 1A and FIG. 1B of the production method of a rare earth magnet of the present disclosure. FIG. 2A is an explanatory diagram schematically illustrating a green compact of a coated magnetic powder and a binder powder. FIG. 2B is an explanatory diagram illustrating the state when the green compact of FIG. 2A is heated and the particles of the binder powder are melted. FIG. 2C is an explanatory diagram schematically illustrating the state when a pressure is applied in the state of FIG. 2B.

As illustrated in FIG. 2A, a green compact 30 is formed by a coated magnetic powder 14 and a binder powder 20. The coated magnetic powder 14 is obtained by forming a coating 12 on the surface of a samarium-iron-nitrogen-based magnetic powder.

When the green compact 30 is heated, as illustrated in FIG. 2B, the binder powder 20 is melted. In the state of FIG. 2B, as illustrated in FIG. 2C, a pressure is applied to the green compact 30 in the direction indicated by hollow arrows, as a result, respective particles of the coated magnetic powder 14 flow to get closer. When the pressure sintering is completed in the state illustrated in FIG. 2C, a sintered body having a high density is obtained.

In this way, the method illustrated in FIG. 2A and FIG. 2B differs in that the binder powder 20 melts when the green compact 30 is heated, but with respect to the others, as with the method illustrated in FIG. 1A to FIG. 1C, each particle of the coated magnetic powder 14 successfully flows during pressure sintering, and a sintered body having a high density is obtained. Incidentally, in the case where the coating 12 formed on the particle surface of the coated magnetic powder 14 is made of the same material as that of the binder powder 20, the coating 12 also melts at the time of pressure sintering. However, when the coating 12 is formed in advance, the effects of the present invention are obtained even when the coating 12 is melted at the time of pressure sintering.

The constituent features of the production method of a rare earth magnet of the present disclosure, which has been accomplished based on the findings, etc. discussed hereinbefore, are described below.

<<Production Method of Rare Earth Magnet>>

The production method of a rare earth magnet of the present disclosure includes a coated magnetic powder preparation step, a mixed powder preparation step, and a pressure sintering step. Each step is described below.

<Coated Magnetic Powder Preparation Step>

A coated magnetic powder is obtained by forming a zinc-containing coating on the particle surface of a magnetic powder containing samarium, iron and nitrogen and including a magnetic phase having at least either one of $Th_2Zn_{17}$ type and $Th_2Ni_{17}$ type crystal structures. The zinc-containing coating means at least either a coating containing metallic zinc or a coating containing a zinc alloy.

The magnetic powder containing samarium, iron and nitrogen and including a magnetic phase having at least either one of $Th_2Zn_{17}$ type and $Th_2Ni_{17}$ type crystal structures, as described above, is referred to as "samarium-iron-nitrogen-based magnetic powder". Details of the samarium-iron-nitrogen-based magnetic powder are described later. In addition, in the coated magnetic powder preparation step, a zinc-containing powder is used. Details of the zinc-containing powder are also described later.

As long as a zinc-containing coating can be formed on the particle surface of a samarium-iron-nitrogen-based magnetic powder, the method for forming the coating is not particularly limited. At the later-described pressure sintering step, the neighborhood of the interface between the particle surface of the samarium-iron-nitrogen-based magnetic powder and the coating is modified by the coating on the particle surface of the coated magnetic powder. Therefore, at the stage of obtaining a coated magnetic powder, the neighborhood of the interface between the particle surface of the samarium-iron-nitrogen-based magnetic powder and the coating may or may not be modified.

The method for forming the coating includes, for example, a method using a rotary kiln and a vapor deposition method, etc. Each of these methods is described briefly.

<Method Using Rotary Kiln>

Figure 3:
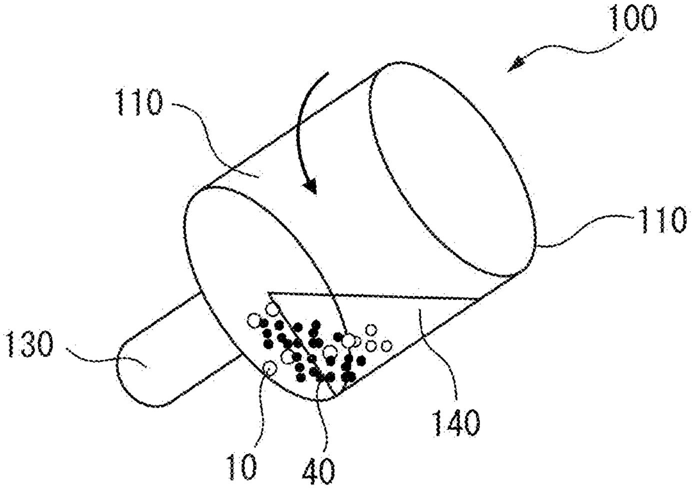
FIG. 3 is an explanatory diagram illustrating one example of the method of forming a zinc-containing coating on the particle surface of a samarium-iron-nitrogen-based magnetic powder by using a rotary kiln.

FIG. 3 is an explanatory diagram illustrating one example of the method of forming a zinc-containing coating on the particle surface of a samarium-iron-nitrogen-based magnetic powder by using a rotary kiln.

A rotary kiln 100 has a stirring drum 110. The stirring drum 110 has a material storing part 120, a rotary shaft 130, and a stirring plate 140. To the rotary shaft 130, a rotary unit (not shown) such as electric motor is connected.

A samarium-iron-nitrogen-based magnetic powder 10 and a zinc-containing powder 40 are charged into the material storing part 120. Thereafter, the material storing part 120 is heated by a heater (not shown) while rotating the stirring drum 110.

When the material storing part 120 is heated at a temperature below the melting point of the zinc-containing powder 40, a zinc component of the zinc-containing powder 40 undergoes solid-phase diffusion to the particle surface of the samarium-iron-nitrogen-based magnetic powder 10, as a result, a zinc-containing coating is formed on the particle surface of the samarium-iron-nitrogen-based magnetic powder. When the material storing part 120 is heated above the melting point of the zinc-containing powder 40, a melt of the zinc-containing powder is obtained, and when the solution is brought into contact with a magnetic raw material powder 150 and in this state, the material storing part 120 is cooled, a zinc-containing coating is formed on the particle surface of the samarium-iron-nitrogen-based magnetic powder. In both cases, the neighborhood of the interface between the particle surface of the samarium-iron-nitrogen-based magnetic powder and the coating is modified.

The operation conditions of the rotary kiln may be appropriately determined so that a desired coating can be obtained.

Denoting as T the melting point of the zinc-containing powder, the heating temperature of the material storing part may be, for example, (T−50° C.) or more, (T−40° C.) or more, (T−30° C.) or more, (T−20° C.) or more, (T−10° C.) or more, or T° C. or more, and may be (T+50° C.) or less, (T+40° C.) or less, (T+30° C.) or less, (T+20° C.) or less, or (T+10° C.) or less. Here, in the case where the zinc-containing powder is a powder containing metallic zinc, T is the melting point of zinc. In addition, in the case where the zinc-containing powder is a powder containing a zinc alloy, T is the melting point of the zinc alloy.

The rotating speed may be, for example, 5 rpm or more, 10 rpm or more, or 20 rpm or more, and may be 200 rpm or less, 100 rpm or less, or 50 rpm or less. The atmosphere at the time of rotation is preferably an inert gas atmosphere so as to prevent oxidation of the powder, the coating formed, etc. The inert gas atmosphere includes a nitrogen gas atmosphere.

After a zinc-containing coating is formed on the particle surface of the samarium-iron-nitrogen-based magnetic powder, when particles of the coted magnetic powder cohere together, the coherent body may be crushed. The crushing method is not particularly limited and includes, for example, a crushing method using a ball mill, a jaw crusher, a jet mill, a cutter mill, or a combination thereof.

<Vapor Deposition Method>

Figure 4:
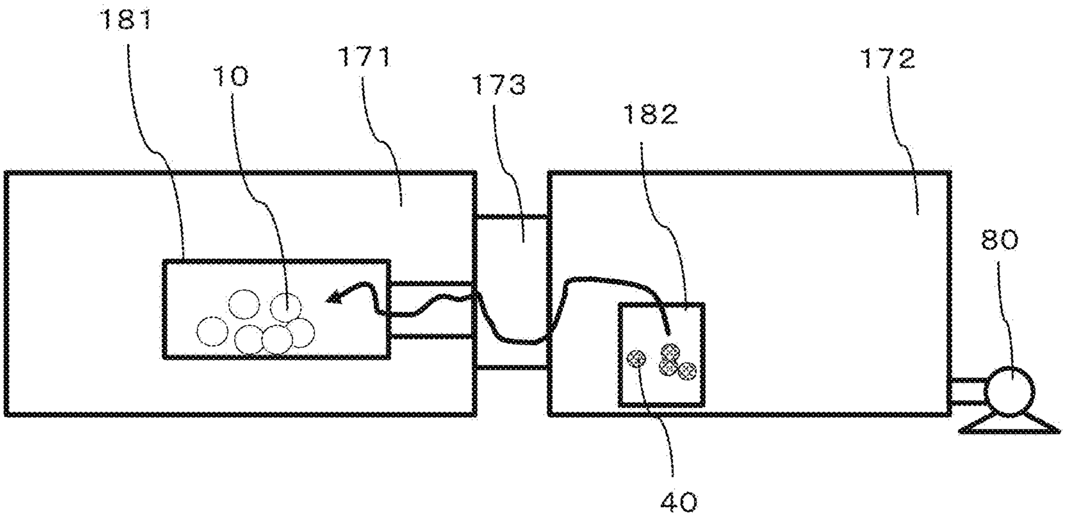
FIG. 4 is an explanatory diagram illustrating one example of the method of forming a zinc-containing coating on the particle surface of a samarium-iron-nitrogen-based magnetic powder by a vapor deposition method.

FIG. 4 is an explanatory diagram illustrating one example of the method of forming a zinc-containing coating on the particle surface of a samarium-iron-nitrogen-based magnetic powder by a vapor deposition method.

A samarium-iron-nitrogen-based magnetic powder 10 is stored in a first container 181, and a zinc-containing powder 40 is stored in a second container 182. The first container 181 is stored in a first heat-treatment furnace 171, and the second container 182 is stored in a second heat-treatment furnace 172. The first heat-treatment furnace 171 and the second heat-treatment furnace 172 are connected via a connection path 173. The first heat-treatment furnace 171, the second heat-treatment furnace 172, and the connection path 173 have airtightness, and a vacuum pump 180 is connected to the second heat-treatment furnace.

After insides of the first heat-treatment furnace 171, the second heat-treatment furnace 172 and the connection path 173 are depressurized by the vacuum pump 180, the insides of these are heated. Then, a vapor containing zinc evaporates from the zinc-containing powder 40 stored in the second container 182. As indicated by a solid-line arrow in FIG. 4, the zinc-containing vapor moves from the inside of the second container 182 to the inside of the first container 181.

The zinc-containing vapor moved to the inside of the first container 181 is cooled to form (deposit) a coating on the particle surface of the samarium-iron-nitrogen-based magnetic powder 10. The neighborhood of the interface between the thus-obtained coating and the particle surface of the samarium-iron-nitrogen-based magnetic powder is not modified.

When a rotary container is used for the first container 181, the container can be treated like a kiln furnace, and the percentage of coverage with the coating formed on the surface of the samarium-iron-nitrogen-based magnetic powder 10 can further be increased. The percentage of coverage is described later.

Various conditions when forming a coating by the method illustrated in FIG. 4 may be appropriately determined so that a desired coating can be obtained.

The temperature of the first heat-treatment furnace (heating temperature of the samarium-iron-nitrogen-based magnetic powder) may be, for example, 120° C. or more, 140° C. or more, 160° C. or more, 180° C. or more, 200° C. or more, or 220° C. or more, and may be 300° C. or less, 280° C. or less, or 260° C. or less.

The temperature of the second heat-treatment furnace (heating temperature of the zinc-containing powder) may be, denoting as T the melting point of the zinc-containing powder, for example, T° C. or more, (T+20° C.) or more, (T+40° C.) or more, (T+60)° C. or more, (T+80° C.) or more, (T+100° C.) or more, or (T+120° C.) or more, and may be (T+200° C.) or less, (T+180° C.) or less, (T+160° C.) or less, or (T+140° C.) or less. Here, in the case where the zinc-containing powder is a powder containing metallic zinc, T is the melting point of zinc. In addition, in the case where the zinc-containing powder is a powder containing a zinc alloy, T is the melting point of the zinc alloy. In the second container 182, a bulk material containing zinc may be stored, but from the viewpoint of rapidly melting the charge material in the second container 182 and generating a zinc-containing vapor from the melt, it is preferable to store the zinc-containing powder in the second container 182.

The first heat-treatment furnace and second heat-treatment furnace are set to a reduced-pressure atmosphere so as to promote generation of a zinc-containing vapor and prevent oxidation of the powder and the coating, etc. formed. The ambient pressure is, for example, preferably $1\times10^{-5}$ MPa or less, more preferably $1\times10^{-6}$ MPa or less, still more preferably $1\times10^{-7}$ MPa or less. On the other hand, there is practically no problem even if the pressure is not excessively reduced, and as long as the above-described ambient pressure is satisfied, the ambient pressure may be $1\times10^{-8}$ MPa or more.

In the case where the first container 181 is a rotary container, the rotating speed may be, for example, 5 rpm or more, 10 rpm or more, or 20 rpm or more, and may be 200 rpm or less, 100 rpm or less, or 50 rpm or less.

In the vapor deposition method as well, after a zinc-containing coating is formed on the particle surface of the samarium-iron-nitrogen-based magnetic powder, when particles of the coted magnetic powder cohere together, the coherent body may be crushed. The crushing method is not particularly limited and includes, for example, a crushing method using a ball mill, a jaw crusher, a jet mill, a cutter mill, or a combination thereof.

In the case of forming a coating on the surface of the samarium-iron-nitrogen-based magnetic powder by either one of these methods, as the percentage of coverage with the coating is higher, the flowability of particles in the later-described pressure sintering step can be more improved. Next, the method for determining the percentage of coverage is described.

<Percentage of Coverage>

Figure 5:
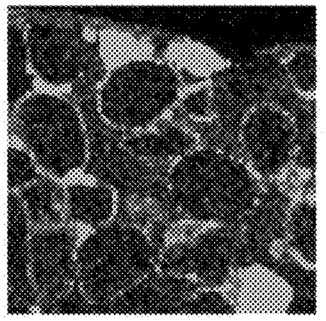
FIG. 5 is an image illustrating one example of zinc area analysis of the coated magnetic powder by using TEM-EDX. The portion displayed bright indicates that zinc is present.

The percentage of coverage with the coating formed on the particle surface of the samarium-iron-nitrogen-based magnetic powder is determined by observing particles of the coated magnetic powder by means of a transmission electron microscope (TEM: Transmission electron microscopy) and subjecting the coating portion to area analysis for zinc by an energy-dispersive X-ray (EDX: Energy-Dispersive X-ray spectroscopy). FIG. 5 is an image illustrating one example of zinc area analysis of the coated magnetic powder by means of TEM-EDX. The portion displayed bright indicates that zinc is present.

In FIG. 5, the granular portion displayed dark indicates a particle of the samarium-iron-nitrogen-based magnetic powder, and the linear portion displayed bright therearound indicates a zinc-containing coating. In a cross-section of the thus-displayed particle of the coated magnetic powder, the percentage of the length of the portion in which the particle surface of the samarium-iron-nitrogen-based magnetic powder is covered with the zinc-containing coating (the length of the linear portion displayed bright), relative to the entire circumferential length of the particle surface of the samarium-iron-nitrogen-based magnetic powder (the total length of the outer circumference of the granular portion displayed dark), is defined as the percentage of coverage.

The percentage of coverage obtained in this way is preferably 90% or more, more preferably 95% or more, and ideally 100% (the particle of the samarium-iron-nitrogen-based magnetic powder is completely covered).

The particle of the samarium-iron-nitrogen-based magnetic powder is very hard. Compared to this, the particle of the zinc-containing powder is generally soft. Accordingly, by the only mixing of the samarium-iron-nitrogen-based magnetic powder and the zinc-containing powder, a deformed particle of the zinc-containing powder sometimes adheres to the particle surface of the samarium-iron-nitrogen-based magnetic powder and forms a coating. However, only by mixing, it is difficult to stably make the coverage percentage be 90% or more. Therefore, at the preparation of the coated magnetic powder, the above-described method using a rotary kiln and vapor deposition method, etc. are preferably employed.

<Mixing Step>

A binder powder having a melting point not higher than the melting point of the coating and the coated magnetic powder are mixed to obtain a mixed powder. Details of the binder powder are described later.

The method for mixing a binder powder and the coated magnetic power is not particularly limited. The mixing method includes a method of mixing the powders by using a mortar, NOBILTA (registered trademark), a Muller wheel mixer, an agitator mixer, a mechanofusion, a V-type mixer, and/or a ball mill, etc. These methods may also be combined. Incidentally, the V-type mixer is an apparatus having a container formed by connecting two cylindrical containers in V shape, in which the container is rotated to cause the powders in the container to repeatedly experience aggregation and separation due to gravity and centrifugal force and thereby be mixed.

The above-described mixer, etc. may not be used for the mixing of a binder powder and the coated magnetic powder. This technique includes, for example, a method where at the time of storing each of the binder powder and the coated magnetic powder in a cavity of a die used in the later-described pressure sintering step, the binder powder and the coated magnetic power are mixed by the storing operation.

<Pressure Sintering Step>

The mixed powder is pressure-sintered. Alternatively, after a green compact is obtained by compression-molding the mixed powder before pressure sintering, the green compact may be pressure-sintered. The compression molding of the mixed powder is described later.

By employing pressure sintering, when the mixed powder is heated and the binder powder in the mixed powder is softened or melted, the applied pressure allows particles of the coated magnetic powder to flow. At the later-described pressure sintering temperature, when it is higher than the melting point of the zinc-containing coating, the coating of the coated magnetic powder melts, but the particles of the samarium-iron-nitrogen-based magnetic powder can be caused to flow, and the effects of the present invention can be obtained similarly.

The pressure sintering temperature is described below. In the following description, the temperature at which a peak disappears in the X-ray diffraction pattern of the binder powder is denoted as $T_1$° C., and the temperature at which the magnetic phase of the samarium-iron-nitrogen-based magnetic powder decomposes is denoted as $T_2$° C.

When the pressure sintering temperature is ($T_2$−50° C.) or less, the magnetic phase is kept from decomposition. From this viewpoint, the pressure sintering temperature may be ($T_2$−75° C.) or less, ($T_2$−100° C.) or less, or ($T_2$−125° C.) or less. Here, the decomposition temperature of the magnetic phase is about 550° C. As described above, when a zinc-containing coating is formed in advance on the particle surface of the samarium-iron-nitrogen-based magnetic powder, even if the coating is melted during pressure sintering, the effects of the present can be obtained. From the viewpoint of unfailingly obtaining the effects of the present invention, denoting as $T_3$° C. the melting point of the zinc-containing coating formed on the particle surface of the samarium-iron-nitrogen-based magnetic powder, the pressure sintering temperature may be less than $T_3$° C., ($T_3$−5° C.) or less, ($T_3$−10° C.) or less, or ($T_3$−15° C.) or less.

The pressure sintering temperature should not be lower than the temperature at which the binder powder is softened, as long as it does not exceed the upper limit temperature above. The temperature at which the binder powder is softened is obtained by subjecting the binder powder to X-ray diffraction analysis. This is described using the drawing by taking a metallic zinc powder as an example.

Figure 6:
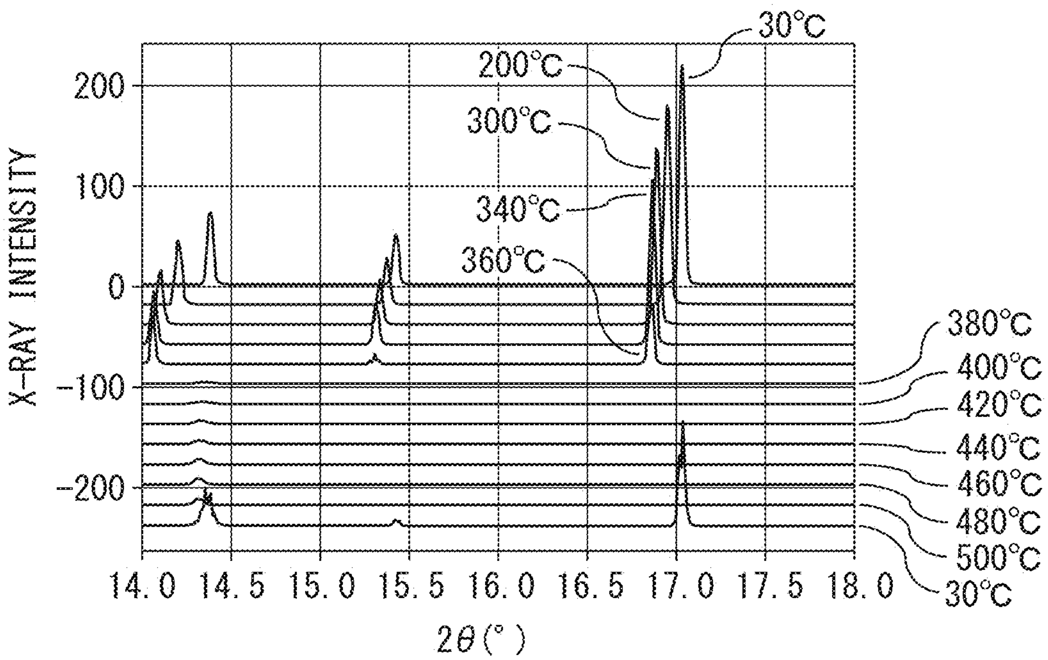
FIG. 6 is a chart diagram illustrating X-ray diffraction patterns at respective temperatures when the X-ray diffraction analysis is performed while heating a metallic zinc powder.

FIG. 6 is a chart diagram illustrating X-ray diffraction patterns at respective temperatures when the X-ray diffraction analysis is performed while heating a metallic zinc powder.

The metallic zinc has a crystal structure of hexagonal close-packed structure (HCP) and therefore, when the metallic zinc powder is analyzed by X-ray diffraction analysis, a peak appears at a specific angle. As illustrated in FIG. 6, a peak disappears at 380° C. On the other hand, the melting point of the metallic zinc is 419° C. that is higher than 380° C. Although not bound by theory, the reason for this is considered to be that the metallic zinc is softened at 380° C. and consequently, the crystal structure is deformed or the crystal structure is disturbed.

In the production method of a rare earth magnet of the present disclosure, softening of the binder powder contributes to the enhancement of flowability of the powder particle. Accordingly, the pressure sintering temperature should not be lower than the temperature at which the binder powder is softened, i.e., should be not lower than the temperature $T_1$° C. at which a peak disappears in the X-ray diffraction pattern of the binder powder. It is considered that as the temperature is higher, softening of the binder powder proceeds. Therefore, the pressure sintering temperature may be ($T_1$+5° C.) or more, ($T_1$+10° C.) or more, ($T_1$+15° C.) or more, or ($T_1$+20° C.) or more.

As described above, the binder powder may be melted at the time of pressure sintering. Therefore, the pressure sintering temperature may be not lower than the melting point of the binder powder as long as it does not exceed the upper-limit temperature above.

The sintering pressure and sintering time may be appropriately determined taking into account the particle diameter, blending amount, etc. of each of the samarium-iron-nitrogen-based magnetic powder and the binder powder. The sintering pressure may be, for example, 500 MPa or more, 700 MPa or more, 900 MPa or more, 1,100 MPa or more, 1,300 MPa or more, or 1,400 MPa or more, and may be 5,000 MPa or less, 4,000 MPa or less, 3,500 MPa or less, 3,000 MPa or less, 2,500 MPa or less, 2,300 MPa or less, 2,100 MPa or less, 1,900 MPa or less, 1,700 MPa or less, or 1,600 MPa or less. The sintering time may be, for example, 10 seconds or more, 100 seconds or more, 500 seconds or more, 1,000 seconds or more, 1,500 seconds or more, 1,800 seconds or more, 2,000 seconds or more, or 2,500 seconds or more, and may be 3,600 seconds or less, 3,200 seconds or less, 3,000 seconds or less, 2,800 seconds or less, or 2,700 seconds or less.

From the viewpoint of preventing oxidation of the green compact and the sintered body, the sintering is preferably performed in an inert gas atmosphere. The inert gas atmosphere includes a nitrogen gas atmosphere.

Figure 11:
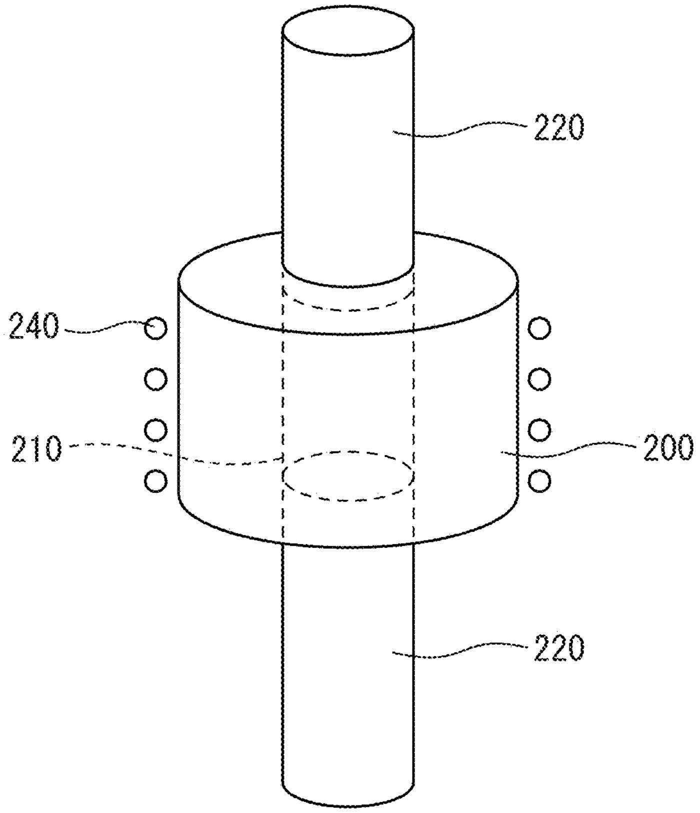
FIG. 11 is an explanatory diagram schematically illustrating one example of the mold used for pressure sintering.

As long as those described hereinabove are satisfied, the method for pressure sintering is not particularly limited. The method includes, for example, a method using a mold having a die and a punch. FIG. 11 is an explanatory diagram schematically illustrating one example of the mold used for pressure sintering. The die 200 has a cavity 210, and the punch 220 slides inside the cavity. The mixed powder is stored in the cavity 210 of the die 200, and the punch 220 is moved to compression-mold the mixed powder. In addition, a heater 240 for heating may be provided on the outer periphery of the cavity.

<Compression Molding Step>

As described above, optionally, a green compact may be obtained by compression-molding the mixed powder before pressure sintering. The compression molding method is not particularly limited. The mold used in the compression molding step may be shared with the mold used in the pressure sintering step and the later-described magnetic field applying step. In the case of sharing the mold used in the compression molding step with the mold used in the pressure sintering step and the magnetic field applying step, the mold is preferably formed of a material that facilitates applying a magnetic field to the inside of the cavity of the mold and can withstand a high temperature and a high pressure during sintering. The material of the mold includes, for example, a tungsten carbide-based cemented carbide and/or Inconel, etc. In addition, a combination of these may also be used. In view of durability, etc. of the mold, the material of the mold is preferably tungsten carbide-based cemented carbide.

From the viewpoint of increasing the density of the sintered body, as long as the durability of the mold is not impaired, the pressure at the time of compression molding is preferably large. The pressure during compression molding may be, for example, 10 MPa or more, 50 MPa or more, 100 MPa or more, 500 MPa or more, or 1,000 MPa or more, and may be 5,000 MPa or less, 4,000 MPa or less, 3,000 MPa or less, or 2,000 MPa or less.

The temperature at the time of compression-molding the mixed powder to obtain a green compact may be a temperature posing no problem in the subsequent pressure sintering step, etc. and is typically room temperature.

The atmosphere at the time of compression-molding the mixed powder to obtain a green compact is not particularly limited but may be an inert gas atmosphere from the viewpoint of suppressing oxidation of the mixed powder and the green compact. The inert gas atmosphere includes a nitrogen gas atmosphere.

<Magnetic Field Applying Step>

At the compression molding of the mixed powder, a magnetic field may be applied to the mixed powder. This makes it possible to impart anisotropy to the sintered body. The magnetic field applying direction is not particularly limited, but, typically, the magnetic field is applied in a direction perpendicular to the compression molding direction of the mixed powder.

The method for applying a magnetic field is not particularly limited. The method for applying a magnetic field includes, for example, a method where the mixed powder is charged into a container and a magnetic field is applied to the mixed powder. The container is not particularly limited as long as a magnetic field can be caused to act on the inside of the container, and, for example, a mold for compression-molding the mixed powder can be used as the container. At the time of applying a magnetic field, for example, a magnetic field generator is provided on the outer periphery of the container. In addition, in the case where the magnetic field applied is large, for example, a magnetizer, etc. can also be used.

The size of the magnetic field applied may be, for example, 100 kA/m or more, 150 kA/m or more, 160 kA/m or more, 300 kA/m or more, 500 kA/m or more, 1,000 kA/m, or 1,500 km/A or more, and may be 4,000 kA/m or less, 3,000 kA/m or less, 2,500 kA/m or less, or 2,000 kA/m or less.

Next, the samarium-iron-nitrogen-based magnetic powder and the binder powder are described. In addition, a zinc-containing powder used in the coated magnetic powder preparation step is described.

<Samarium-Iron-Nitrogen-Based Magnetic Powder>

The magnetic powder used in the production method of a rare earth magnet of the present disclosure contains samarium, iron, and nitrogen and includes a magnetic phase having at least either one of $Th_2Zn_{17}$ type and $Th_2Ni_{17}$ type crystal structures. The crystal structure of the magnetic phase includes, in addition to the above-described structure, for example, a phase having a $TbCu_7$ type crystal structure. Here, Th is thorium, Zn is zinc, Ni is nickel, Tb is terbium, and Cu is copper.

The samarium-iron-nitrogen-based magnetic powder may include a magnetic phase represented by, for example, the composition formula $(Sm_{(1-i)}R_i)_2(Fe_{(1-j)}Co_j)_{17}N_h$. The rare earth magnet (hereinafter, sometimes referred to as "product material") obtained by the production method of the present disclosure exhibits magnetic properties derived from the magnetic phase in the samarium-iron-nitrogen-based magnetic powder. Here, i, j and h are a molar ratio. Note that Sm is samarium, Fe is iron, Co is cobalt, and N is nitrogen.

The magnetic phase in the samarium-iron-nitrogen-based magnetic powder may contain R to an extent not impairing the effects of the production method of the present disclosure and the magnetic properties of the product material. Such a range is represented by i in the composition formula above. i may be, for example, 0 or more, 0.10 or more, or 0.20 or more, and may be 0.50 or less, 0.40 or less, or 0.30 or less. R is one or more selected from rare earth elements other than samarium, and yttrium and zirconium. In the present description, the rare earth element indicates scandium, lanthanum, cerium, praseodymium, neodymium, promethium, samarium, europium, gadolinium, terbium, dysprosium, holmium, erbium, thulium, ytterbium, and ruthenium.

With respect to $(Sm_{(1-i)}R_i)_2(Fe_{(1-j)}Co_j)_{17}N_h$, typically, R is substituted at the position of Sm of $Sm_2(Fe_{(1-j)}Co_j)_{17}N_h$, but the configuration is not limited thereto. For example, part of R may be interstitially disposed in $Sm_2(Fe_{(1-j)}Co_j)_{17}N_h$.

The magnetic phase in the samarium-iron-nitrogen-based magnetic powder may contain Co to an extent not impairing the effects of the production method of a rare earth magnet of the present disclosure and the magnetic properties of the product material. Such a range is represented by j in the composition formula above. j may be 0 or more, 0.10 or more, or 0.20 or more, and may be 0.52 or less, 0.40 or less, or 0.30 or less.

With respect to $(Sm_{(1-i)}R_i)_2(Fe_{(1-j)}Co_j)_{17}N_h$, typically, Co is substituted at the position of Fe of $(Sm_{(1-i)}R_i)_2Fe_{17}N_h$, but the configuration is not limited thereto. For example, part of Co may be interstitially disposed in $(Sm_{(1-i)}R_i)_2Fe_{17}N_h$.

The magnetic phase in the samarium-iron-nitrogen-based magnetic powder contributes to the development and enhancement of the magnetic properties when N is interstitially present in a crystal grain represented by $(Sm_{(1-i)}R_i)_2(Fe_{(1-j)}Co_j)_{17}$.

With respect to $(Sm_{(1-i)}R_i)_2(Fe_{(1-j)}Co_j)_{17}N_h$, h may be from 1.5 to 4.5, but typically, the configuration is $(Sm_{(1-i)}R_i)_2(Fe_{(1-j)}Co_j)_{17}N_3$. h may be 1.8 or more, 2.0 or more, or 2.5 or more, and may be 4.2 or less, 4.0 or less, or 3.5 or less. The content of $(Sm_{(1-i)}R_i)_2(Fe_{(1-j)}Co_j)_{17}N_3$ relative to the entire $(Sm_{(1-i)}R_i)_2(Fe_{(1-j)}Co_j)_{17}N_h$ is preferably 70 mass % or more, more preferably 80 mass % or more, still more preferably 90 mass %. On the other hand, all of $(Sm_{(1-i)}R_i)_2(Fe_{(1-j)}Co_j)_{17}N_h$ need not be $(Sm_{(1-i)}R_i)_2(Fe_{(1-j)}$ $Co_j)_{17}N_3$. The content of $(Sm_{(1-i)}R_i)_2(Fe_{(1-j)}Co_j)_{17}N_3$ relative to the entire $(Sm_{(1-i)}R_i)_2(Fe_{(1-j)}Co_j)_{17}N_h$ may be 99 mass % or less, 98 mass % or less, or 97 mass % or less.

The samarium-iron-nitrogen-based magnetic powder may contain, in addition to the magnetic phase represented by $(Sm_{(1-i)}R_i)_2(Fe_{(1-j)}Co_j)_{17}N_h$, oxygen and M' as well as unavoidable impurity elements to an extent substantially not impairing the effects of the production method of a rare earth magnet of the present disclosure and the magnetic properties of the product material. From the viewpoint of ensuring the magnetic properties of the product material, the content of the magnetic phase represented by $(Sm_{(1-i)}R_i)_2(Fe_{(1-j)}Co_j)_{17}N_h$ relative to the entire samarium-iron-nitrogen-based magnetic powder may be 80 mass % or more, 85 mass % or more, or 90 mass % or more. On the other hand, even when the content of the magnetic phase represented by $(Sm_{(1-i)}R_i)_2(Fe_{(1-j)}Co_j)_{17}N_h$ relative to the entire samarium-iron-nitrogen-based magnetic powder is not excessively increased, there is no problem in practical use. Accordingly, the content thereof may be 99 mass % or less, 98 mass % or less, or 97 mass % or less. The remainder of the magnetic phase represented by $(Sm_{(1-i)}R_i)_2(Fe_{(1-j)}Co_j)_{17}N_h$ is the content of oxygen and $M^1$. In addition, part of $M^1$ may be interstitially or substitutionally present in the magnetic phase.

The above-described $M^1$ includes one or more elements selected from the group consisting of gallium, titanium, chromium, zinc, manganese, vanadium, molybdenum, tungsten, silicon, rhenium copper, aluminum, calcium, boron, nickel, and carbon. The unavoidable impurity element indicates an impurity element that is unavoidably contained or causes a significant rise in the production cost for avoiding its inclusion. Such an element may be substitutionally and/or interstitially present in the above-described magnetic phase, may be present in a phase other than the magnetic phase, or may be present at the grain boundary of these phases.

The particle diameter of the samarium-iron-nitrogen-based magnetic powder is not particularly limited as long as the product material has desired magnetic properties and the effects of the production method of a rare earth magnet of the present disclosure are not hindered. The particle diameter of the samarium-iron-nitrogen-based magnetic powder may be, in terms of $D_{50}$, for example, 1 μm or more, 2 μm or more, 3 μm or more, 4 μm or more, 5 μm or more, 6 μm or more, 7 μm or more, 8 μm or more, or 9 μm or more, and may be 20 μm or less, 19 μm or less, 18 μm or less, 17 μm or less, 16 μm or less, 15 μm or less, 14 μm or less, 13 μm or less, 12 μm or less, 11 μm or less, or 10 μm or less. $D_{50}$ means a median diameter. In addition, $D_{50}$ of the samarium-iron-nitrogen-based magnetic powder is measured, for example, by a dry laser diffraction scattering method, etc.

In the production method of a rare earth magnet of the present disclosure, the neighborhood of the particle surface of the samarium-iron-nitrogen-based magnetic powder is modified in the coated magnetic powder preparation step or the pressure sintering step. Oxygen in the samarium-iron-nitrogen-based magnetic powder is absorbed by the coating on the particle surface of the coated magnetic powder or by the zinc component of the binder powder, and magnetic properties, particularly, the coercive force, of the product material can thereby be enhanced. The content of oxygen in the samarium-iron-nitrogen-based magnetic powder may be determined by taking into account the amount in which oxygen in the samarium-iron-nitrogen-based magnetic powder is absorbed. The content of oxygen in the samarium-iron-nitrogen-based magnetic powder is preferably lower relative to the entire samarium-iron-nitrogen-based magnetic powder. The oxygen content of the samarium-iron-nitrogen-based magnetic powder is preferably 2.00 mass % or less, more preferably 1.34 mass % or less, still more preferably 1.05 mass % or less, relative to the entire samarium-iron-nitrogen-based magnetic powder. On the other hand, if the content of oxygen in the samarium-iron-nitrogen-based magnetic powder is extremely reduced, this leads to a rise in the production cost. Therefore, the oxygen content of the samarium-iron-nitrogen-based magnetic powder may be 0.1 mass % or more, 0.2 mass % or more, or 0.3 mass % or more, relative to the entire samarium-iron-nitrogen-based magnetic powder.

As long as those described hereinabove are satisfied, the production method of the samarium-iron-nitrogen-based magnetic powder is not particularly limited, and a commercial product may also be used. The production method of the samarium-iron-nitrogen-based magnetic powder includes, for example, a method where a samarium-iron alloy powder is produced from a samarium oxide and an iron powder by a reduction diffusion method and the resulting powder is heat-treated at 600° C. or less in an atmosphere of a mixed gas of nitrogen and hydrogen, a nitrogen gas, an ammonia gas, etc. to obtain a samarium-iron-nitrogen-based magnetic powder. Alternatively, the production method includes, for example, a method where a samarium-iron alloy is produced by a dissolution method, the alloy is coarsely pulverized, and the obtained coarsely pulverized grains are nitrided, and the grains are further pulverized until reaching the desired particle diameter. At the time of pulverization, for example, a dry jet mill, a dry ball mill, a wet ball mill, or a wet bead mill, etc. can be used. In addition, a combination thereof may also be used.

<Binder Powder>

The binder powder has a melting point not higher than the melting point of zinc. The binder powder is mixed with the samarium-iron-nitrogen-based magnetic powder and subjected to pressure sintering. Accordingly, the binder powder is typically a metal powder and/or an alloy powder. That is, the binder powder is a metal powder and/or an alloy powder each having a melting point not higher than the melting point of zinc.

When the melting point of the binder powder is less than the melting point of the zinc-containing coating, even if the binder powder turns into a melt, the coating on the particle surface of the coated magnetic powder is difficult to melt, and flow of particle powders can be promoted. Even when the melting point of the binder powder is the same as the melting point of the zinc-containing coating and the coating on the particle surface of the coated magnetic powder is melted by performing the pressure sintering at a temperature above the melting point of zinc, as long as the coating is applied in advance, the flowability of powder particles can be continuously promoted.

In the conventional production method of a rare earth magnet, for example, in the production method disclosed in Patent Literature 1, the zinc-containing binder serves as both a binder and a modifier. On the other hand, in the production method of a rare earth magnet of the present disclosure, modification may be performed in the coated magnetic powder preparation step, and therefore a powder containing a metal other than zinc and a powder containing an alloy of a metal other than zinc can be used as the binder powder.

As described above, in the coated magnetic powder, the neighborhood of the interface between the particle surface of the samarium-iron-nitrogen-based magnetic powder and the coating is modified at lease in either the coated magnetic powder preparation step or the pressure sintering step. In the description below, a phase produced by the modification is sometimes referred to as "modified phase".

The particle surface of the samarium-iron-nitrogen-based magnetic powder is susceptible to oxidation. Accordingly, on the particle surface of the samarium-ion-nitrogen-based magnetic powder, an unstable phase is present other than a complete magnetic phase. If the unstable phase is decomposed, it works out to an αFe supply source, and the coercive force is reduced. Therefore, reduction in the coercive force is suppressed by the formation of a modified phase.

The modified phase is considered to be a zinc-iron phase (Zn—Fe phase) formed by the reaction of the zinc-containing coating formed on the particle surface of the samarium-iron-nitrogen-based magnetic powder with an αFe phase. The zinc-iron phase includes, for example, a Γ phase, a $\Gamma_1$ phase, a $\delta_{1k}$ phase, a $\delta_{1p}$ phase, and ξ phase, etc.

In order to suppress the reduction in the coercive force, the binder powder is preferably a powder having as little adverse effect as possible on the formation and maintenance of the modified phase. Such a binder powder includes, for example, a powder containing metallic zinc, a powder containing a zinc alloy, a powder containing an aluminum-lanthanum-copper-based alloy, a powder containing metallic tin, and a powder containing metallic bismuth, as well as a combination thereof, etc.

The metallic zinc means zinc that is not alloyed. The purity of the metallic zinc may be 95.0 mass % or more, 98.0 mass % or more, 99.0 mass % or more, or 99.9 mass % or more. A metallic zinc powder produced by hydrogen plasma reaction method (HRMR method) may also be used.

When the zinc alloy is represented by zinc-$M^2$, $M^2$ preferably comprises an element being alloyed with zinc to lower the melting point (melting initiation temperature) of the zinc alloy to below the melting point of zinc and an unavoidable impurity element. $M^2$ that lowers the melting point of the zinc alloy to below the melting point of zinc includes an element forming a eutectic alloy with zinc and $M^2$. Such $M^2$ includes, typically, tin, magnesium, and aluminum as well as a combination thereof, etc. Such an element having an action of lowering the melting point and an element not inhibiting the properties of the product material can also be selected as $M^2$. The unavoidable impurity element indicates an impurity element that is unavoidably contained or causes a significant rise in the production cost for avoiding its inclusion, such as impurities contained in raw materials of the binder powder.

In the zinc alloy represented by zinc-$M^2$, the ratio (molar ratio) of zinc and $M^2$ may be appropriately determined so as to make the pressure sintering temperature proper. The ratio (molar ratio) of $M^2$ to the entire zinc alloy may be, for example, 0.02 or more, 0.05 or more, 0.10 or more, or 0.20 or more, and may be 0.90 or less, 0.80 or less, 0.70 or less, 0.60 or less, 0.50 or less, 0.40 or less, or 0.30 or less.

A zinc-aluminum-base alloy that is a typical zinc alloy is further described. The zinc-aluminum-based alloy may contain from 8 to 90 at % of zinc and from 2 to 10 at % of aluminum. Alternatively, the zinc-aluminum-based alloy may contain from 2 to 10 at % of aluminum, with the remainder being zinc and unavoidable impurities.

The aluminum-lanthanum-coper-based alloy may contain from 5 to 20 at % of aluminum, from 55 to 75 at % of lanthanum, and from 15 to 25 at % of copper. Alternatively, the aluminum-lanthanum-coper-based alloy may contain from 5 to 20 at % of aluminum and from 15 to 25 at % of copper, with the remainder being lanthanum and unavoidable impurities.

The metallic tin means tin that is not alloyed. The purity of the metallic tin may be 95.0 mass % or more, 98.0 mass % or more, 99.0 mass % or more, or 99.9 mass % or more.

The metallic bismuth means bismuth that is not alloyed. The purity of the metallic bismuth may be 95.0 mass % or more, 98.0 mass % or more, 99.0 mass % or more, or 99.9 mass % or more.

The particle diameter of the binder powder is not particularly limited but is preferably smaller than the particle diameter of the samarium-iron-nitrogen-based magnetic powder. The particle diameter of the binder powder may be, in terms of $D_{50}$ (median diameter), for example, more than 0.1 μm, 0.5 μm or more, 1 μm or more, or 2 μm or more, and may be 12 μm or less, 11 μm or less, 10 μm or less, 9 μm or less, 8 μm or less, 7 μm or less, 6 μm or less, 5 μm or less, or 4 μm or less. In addition, the particle diameter of the binder powder is measured, for example, by a dry laser diffraction scattering method, etc.

The binder powder does not contribute to development of the magnetic force, and therefore if the amount of the binder powder mixed is excessive, the magnetization of the product material is reduced. From the viewpoint of ensuring the function as a binder, the binder powder may be mixed to account for 1 mass % or more, 3 mass % or more, or 5 mass % or more, relative to the coated magnetic powder. From the viewpoint of suppressing the reduction in the magnetization of the product material, the binder powder may be mixed to account for 20 mass % or less, 15 mass % or less, or 10 mass % or less, relative to the coated magnetic powder.

As is understood from these descriptions, one or more powders selected from the group consisting of a powder containing metallic zinc, a powder containing a zinc-aluminum-based alloy, a powder containing an aluminum-lanthanum-copper-based alloy, a powder containing metallic tin, and a powder containing metallic bismuth can be used as the binder powder.

In the descriptions above, for example, "a powder containing metallic zinc" means that the powder may contain a substance that is unavoidably contained, other than the metallic zinc powder. The content of the unavoidable impurity is preferably 5 mass % or less, relative to the entire metallic zinc-containing powder. Incidentally, the unavoidable impurity indicates a substance that is unavoidably contained at the time of, for example, producing a metallic zinc powder, and is typically an oxide. The same as described here applies to the powder other than the metallic zinc-containing powder.

<Zinc-Containing Powder>

A zinc-containing powder is used in the coated magnetic powder preparation step. A zinc-containing powder used as the binder powder can be used also in the coated magnetic powder preparation step. In this regard, the coating on the particle surface of the samarium-iron-nitrogen-based magnetic powder absorbs oxygen and contributes to modification. When the oxygen content of the zinc-containing powder is small, oxygen in the samarium-iron-nitrogen-based magnetic powder can be advantageously more absorbed. From this viewpoint, in the case of using a zinc-containing powder in the coated magnetic powder preparation step, the oxygen content thereof is preferably 5.0 mass % or less, more preferably 3.0 mass %, still more preferably 1.0 mass % or less, relative to the entire zinc-containing powder. On the other hand, if the content of oxygen in the zinc-containing powder is extremely reduced, this leads to a rise in the production cost. Therefore, the oxygen content of the zinc-containing powder may be 0.1 mass % or more, 0.2 mass % or more, or 0.3 mass % or more, relative to the entire zinc-containing powder.

EXAMPLES

The production method of a rare earth magnet of the present disclosure is more specifically described below by referring to Examples and Comparative Examples. Note that the production method of a rare earth magnet of the present disclosure is not limited to the conditions used in the following Examples.

Preparation of Sample

Samples of the rare earth magnet were prepared in the following manner.

Examples 1 to 10

A coated magnetic power was prepared by using a metallic zinc powder on the particle surface of a samarium-iron-nitrogen-based magnetic powder containing 93.0 mass % of $Sm_2Fe_{17}N_3$. The particle size of the samarium-iron-nitrogen-based magnetic powder was 3.16 μm in terms of $D_{50}$. The particle size of the metallic zinc powder was 1.0 μm in terms of $D_{50}$, and the purity of the metallic zinc powder was 99.4 mass %.

In the case of modifying the particle surface of the samarium-iron-nitrogen-based magnetic powder, a coating was formed using a rotary kiln illustrated in FIG. 3, and in the case of not modifying the particle surface, a coating was formed by the method illustrated in FIG. 4 (vapor deposition method).

In the case of using the rotary kiln illustrated in FIG. 3, the treatment was performed over 100 minutes in an argon gas atmosphere (ambient pressure: 30 Pa) by heating the stirring drum at a heating temperature of 410° C. In the case of using the method illustrated in FIG. 4, after setting the temperature of the first heat-treatment furnace at 240° C. and the temperature of the second heat-treatment furnace at 490° C. and setting the degree of vacuum (ambient pressure) in the furnace at 0.1 Pa, the treatment was performed over 300 minutes while rotating the first container within the first heat-treatment furnace. With respect to both the samarium-iron-nitrogen-based magnetic powder and the metallic zinc powder, 20 g of the powder was charged into the first container or the second container. Incidentally, in the case of using the method illustrated in FIG. 4, before the heating of the first heat-treatment furnace and the second heat-treatment furnace was started, the first container and the second container were repeatedly subjected to evacuation and argon gas purge to have the above-described degree of vacuum (ambient pressure).

The thus-prepared coated magnetic powder and a binder powder were mixed to obtain a mixed powder, and the mixed powder was then compression-molded in a magnetic field to obtain a green compact. Furthermore, the green compact was pressure-sintered to obtain a sintered body (rare earth magnet), and this was used as a sample.

The pressure at the time of compression molding was 50 MPa, the size of the applied magnetic field was 800 kA/m, the pressure at the time of pressure sintering was 1,500 MPa, and the atmosphere during pressure sintering was an argon gas atmosphere (97,000 Pa).

Comparative Examples 1 and 2

The sample of Comparative Example 1 was prepared in the same manner as in Examples except that a coating was not formed on the particle surface of the samarium-iron-nitrogen-based magnetic powder. In addition, the sample of Comparative Example 2 was prepared in the same manner as in Examples except that a binder powder was not mixed.

Evaluation

The samples of Examples 1 to 12 and Comparative Examples 1 and 2 were measured for the density and magnetic properties. The measurement was performed at room temperature. The density was measured by the Archimedes method. The coercive force was measured using a vibrating sample magnetometer (VSM), and the residual magnetization was measured by a DC magnetization magnetic flux meter. In addition, with respect to Example 1 and Comparative Example 1, the surface of the sample was polished, and the resulting surface was observed by means of a scanning electron microscope (SEM). Furthermore, with respect to Examples 1 to 12 and Comparative Example 2, the percentage coverage of the coated magnetic powder was determined by the method illustrated in FIG. 5, etc.

The results are shown in Table 1. In Table 1, the presence or absence of a coating, the amount of zinc in the coating, the modification or no modification at the time of coating, the type of the binder powder, the mixing amount of the binder powder, the melting point and softening point of the binder powder, and the sintering temperature are shown together. The amount of zinc in the coating is the mass of the metallic zinc powder relative to the mass of the samarium-iron-nitrogen-based magnetic powder. As for the type of the binder powder, Zn is a powder containing metallic zinc, Zn—Al is a powder including a zinc-aluminum alloy containing 95 at % of zinc and 5 at % of aluminum, Al—La—Cu is a powder including an aluminum-lanthanum-copper alloy containing 15.6 at % of aluminum, 65.0 at % of lanthanum, and 19.4 at % of copper, Sn is a powder containing metallic tin, and Bi is a powder containing metallic bismuth. The mixing amount of the binder powder is the mass of the binder powder relative to the mass of the coated magnetic powder (with respect to Comparative Example 1, the mass of the binder powder relative to the mass of the samarium-iron-nitrogen-based magnetic powder). The softening point of the binder powder is a temperature at which the X-ray diffraction pattern disappears, and "-" indicates that there is no measured value.

Figure 9:
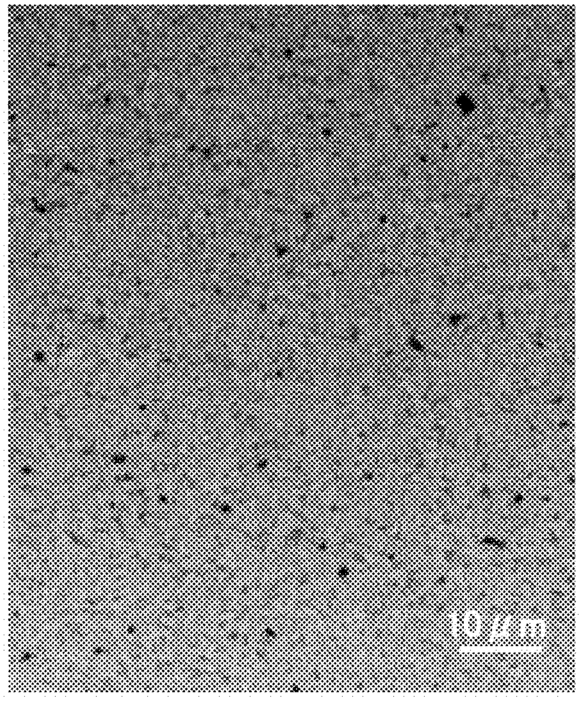
FIG. 9 is an image illustrating a scanning electron microscope image of a surface of the sample of Example 1.
Figure 10:
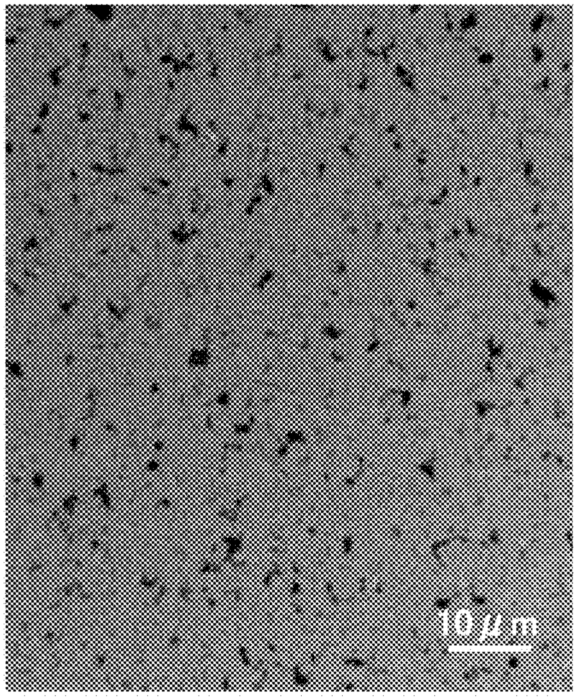
FIG. 10 is an image illustrating a scanning electron microscope image of a surface of the sample of Comparative Example 1.

In addition, FIG. 9 and FIG. 10 illustrate the scanning electron microscope observation results of samples. FIG. 9 is an image illustrating a scanning electron microscope image of a surface of the sample of Example 1. FIG. 10 is an image illustrating a scanning electron microscope image of a surface of the sample of Comparative Example 1. In the images of FIG. 9 and FIG. 10, the portion displayed dark indicates a gap.

TABLE 1

| | Presence or Absence of Coating | Percentage Coverage (%) | Amount of Zinc in Coating (mass %) | Modification or No Modification at the Coating | Type of Binder Powder | Mixing Amount of Binder Powder (mass %) | Melting Point of Binder Powder (° C.) | Softening Point of Binder Powder (° C.) | Sintering Temperature (° C.) | Density (g/cm$^3$) | Residual Magnetization (T) | Cohesive Force (kA/m) |
|---|---|---|---|---|---|---|---|---|---|---|---|---|
| Example 1 | present | 95 | 5 | modified | Zn | 5 | 419 | 380 | 400 | 6.95 | 0.867 | 1020.4 |
| Example 2 | present | 90 | 5 | not modified | Zn | 5 | 419 | 380 | 400 | 6.93 | 0.854 | 1024.3 |
| Example 3 | present | 95 | 5 | modified | Zn—Al | 5 | 380 | — | 400 | 6.93 | 0.842 | 1059.2 |
| Example 4 | present | 95 | 5 | modified | Zn—Al | 5 | 380 | — | 380 | 6.73 | 0.857 | 1091.1 |
| Example 5 | present | 95 | 5 | modified | Al—La—Cu | 5 | 207 | — | 400 | 6.80 | 0.864 | 964.5 |
| Example 6 | present | 95 | 5 | modified | Al—La—Cu | 5 | 207 | — | 250 | 6.71 | 0.803 | 1024.9 |
| Example 7 | present | 95 | 5 | modified | Sn | 5 | 231 | — | 400 | 6.85 | 0.872 | 1042.2 |
| Example 8 | present | 95 | 5 | modified | Sn | 5 | 231 | — | 300 | 6.72 | 0.805 | 1039.9 |
| Example 9 | present | 95 | 5 | modified | Bi | 5 | 271 | — | 400 | 7.18 | 0.812 | 931.1 |
| Example 10 | present | 95 | 5 | modified | Bi | 5 | 271 | — | 300 | 6.81 | 0.809 | 939.4 |
| Comparative Example 1 | none | — | — | — | Zn | 5 | 419 | 380 | 400 | 6.70 | 0.800 | 983.9 |
| Comparative Example 2 | present | 95 | 5 | modified | — | — | — | — | 400 | 6.65 | 0.763 | 993.6 |

It can be understood from Table 1 that in the samples of Examples 1 to 12 where a coating is formed in advance on the particle surface of the samarium-iron-nitrogen-based magnetic powder and the powder is mixed with a binder powder and then pressure-sintered, a sintered body (rare earth magnet) having a high density compared with those using the samples of Comparative Examples 1 and 2 is obtained and the magnetization is enhanced. In addition, it can be understood from FIG. 9 that in the samples of Examples 1 to 12, gaps are less formed and the density is increased.

From these results, the effects of the production method of a rare earth magnet of the present disclosure could be confirmed.

REFERENCE SIGNS LIST

10 Samarium-iron-nitrogen-based magnetic powder
12 Coating
14 Coated magnetic powder
20 Binder powder
30 Green compact
40 Zinc-containing powder
100 Rotary kiln
110 Stirring drum
120 Material storing part
130 Rotary shaft
140 Stirring plate
171 First heat-treatment furnace
172 Second heat-treatment furnace
173 Connection path
180 Vacuum pump
181 First container
182 Second container
200 Die
210 Cavity
220 Punch
240 Heater

The invention claimed is:

1. A production method of a rare earth magnet, comprising:

forming a metal zinc-containing coating on a particle surface of a magnetic powder by using a zinc-containing powder having an oxygen content of 5.0 mass % or less, wherein the magnetic powder contains samarium, iron and nitrogen and includes a magnetic phase having at least either one of $Th_2Zn_{17}$ type and $Th_2Ni_{17}$ type crystal structures to obtain a coated magnetic powder, mixing a binder powder having a melting point not higher than the melting point of the coating with the coated magnetic powder to obtain a mixed powder, compression-molding the mixed powder at a pressure of 50 MPa or more to obtain a green compact and, pressure-sintering the green compact at $T_1$° C. or more and ($T_2$−50° C.) or less, wherein a temperature at which a peak disappears in an X-ray diffraction pattern of the binder powder is denoted as $T_1$° C. and a temperature at which the magnetic phase decomposes is denoted as $T_2$° C., wherein a particle diameter of the magnetic powder is 1 μm or more and 10 μm or less, wherein the binder powder is one or more powders selected from the group consisting of an aluminum-lanthanum-copper-based alloy-containing powder, which are different materials from the material of the metal zinc-containing coating, wherein the pressure of the pressure-sintering is 700 MPa or more and 5,000 MPa or less, wherein the metal zinc-coating reduces friction on the particle surface of the samarium-iron-nitrogen-based magnetic powder during the compression, an αFe phase on the particle surface of the magnetic powder reacts with the metal zinc of the coating during pressure-sintering to form a zinc-iron phase on the particle surface of the magnetic powder, and the binder mutually bonds the magnetic powder particles through the zinc-iron phase during the pressure-sintering, wherein in a cross-section of a particle of the coated magnetic powder, a percentage of the length of a portion where the particle surface of the magnetic powder is covered by the coating, relative to an entire circumferential length of the particle surface of the magnetic powder, is 90% or more, and wherein the rare earth magnet has a coercive force of at least approximately 931 kA/m.

2. The method according to claim 1, wherein the mixed powder is pressure-sintered at a temperature not lower than the melting point of the binder powder.

3. The method according to claim 1, wherein the pressure-sintering is carried out at ($T_1$+5° C.) or more and ($T_2$−75° C.) or less.

4. The method according to claim 1, wherein the pressure-sintering is carried out at ($T_1$+10° C.) or more and ($T_2$−100° C.) or less.

5. The method according to claim 1, wherein the pressure-sintering is carried out at ($T_1$+15° C.) or more and ($T_2$−125° C.) or less.

6. The method according to claim 1, wherein the pressure-sintering is carried oPut at ($T_1$+20° C.) or more and ($T_2$−125° C.) or less.

7. The method according to claim 1, wherein the compression molding is carried out at a pressure of 50 MPa or more and 4,000 MPa or less, and a magnetic field of 150 kA/m or more and 4,000 kA/m or less.

8. The method according to claim 1, wherein the compression molding is carried out at a pressure of 100 MPa or more and 3,000 MPa or less, and a magnetic field of 300 kA/m or more and 3,000 kA/m or less.

9. The method according to claim 1, wherein the compression molding is carried out at a pressure of 500 MPa or more and 2,000 MPa or less, and a magnetic field of 500 kA/m or more and 2,500 kA/m or less.

10. The method according to claim 1, wherein the compression molding is carried out at a pressure of 1,000 MPa or more and 2,000 MPa or less, and a magnetic field of 1,000 kA/m or more and 2,000 kA/m or less.

* * * * *